US012735047B2

(12) United States Patent
Bakhchina et al.

(10) Patent No.: US 12,735,047 B2
(45) Date of Patent: Sep. 15, 2026

(54) DRIVER PSYCHOPHYSIOLOGICAL STATE DETECTION

(71) Applicant: Harman International Industries, Incorporated, Stamford, CT (US)

(72) Inventors: Anastasiya Vladimirovna Bakhchina, Nizhniy Novgorod (RU); Ivan Sergeevich Shishalov, Nizhniy Novgorod (RU); Mariya Yurievna Nevaykina, Nizhny Novgorod (RU); Anton Konstantinovich Yakimov, Nizhny Novgorod (RU); Anton Sergeevich Devyatkin, Nizhny Novgorod (RU); Mikhail Sergeevich Sotnikov, Nizhny Novgorod (RU); Andrey Viktorovich Filimonov, Nizhegorodskaya oblast (RU); Vladimir Vladimirovich Borzikov, Yerevan (AM)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 110 days.

(21) Appl. No.: 18/622,688

(22) Filed: Mar. 29, 2024

(65) Prior Publication Data

US 2024/0326830 A1 Oct. 3, 2024

(30) Foreign Application Priority Data

Mar. 30, 2023 (RU) ........................... RU2023107735

(51) Int. Cl.
*B60W 40/09* (2012.01)
*B60W 40/08* (2012.01)
(Continued)

(52) U.S. Cl.
CPC ............ *B60W 40/09* (2013.01); *B60W 50/14* (2013.01); *G06V 20/597* (2022.01);
(Continued)

(58) Field of Classification Search
CPC ................. B60W 40/09; B60W 50/14; B60W 2040/0872; B60W 2420/403;
(Continued)

(56) References Cited

U.S. PATENT DOCUMENTS 10,081,366 B1 * 9/2018 Dey ...................... B60W 40/08
2004/0044293 A1 * 3/2004 Burton ...................... B60T 7/12
600/544
(Continued)

FOREIGN PATENT DOCUMENTS

JP 2013244116 A 12/2013

OTHER PUBLICATIONS

Yang, J. et al., "Validity Analysis of Vehicle and Physiological Data for Detecting Driver Drowsiness, Distraction, and Workload," Proceedings of the 2015 IEEE International Conference on Systems, Man, and Cybernetics, Oct. 9, 2015, Hong Kong, China, 6 pages.
(Continued)

*Primary Examiner* — Mohamed Barakat
(74) *Attorney, Agent, or Firm* — McCoy Russell LLP

(57) ABSTRACT

It is herein disclosed a method of collecting data for determining a psychophysiological state of a human driver, comprising collecting data throughout a driving session in a car simulator, wherein the driving session comprises a plurality of driving stages, wherein the plurality of driving stages comprise, at least: a first stage of driving by a driver in a first scenario; a second stage of driving by the driver in a first scenario, wherein a first cognitive test is performed by the driver simultaneously with the driving; a third stage of driving by the driver in a second scenario; a fourth stage of
(Continued)

500 collecting data throughout a driving session in a car simulator, wherein the driving session comprises a plurality of driving stages comprising:
a first stage of driving by a driver in a first scenario;
a second stage of driving by the driver in a first scenario, wherein a first cognitive test is performed by the driver simultaneously with the driving;
a third stage of driving by the driver in a second scenario;
a fourth stage of driving by the driver in the second scenario, wherein a second cognitive test is performed by the driver simultaneously with the driving;
wherein each of the first and second cognitive tests is an N-back test; and wherein the first scenario is a relatively monotonous driving scenario comprising simulated highway driving and the second scenario is a relatively complex scenario comprising simulated urban road driving
510 collecting, by a plurality of detection means, physiological data on the driver throughout the driving session; wherein the physiological data collected comprises at least one of: heart rate data, EEG data, eye movement data, and respiration data 512 collecting driver behaviour data, comprising recording steer wheel activity of the driver, and recording the driver's reaction to the cognitive tests 514 analysing the physiological data and the driver behaviour data to determine a psychophysiological state of the driver during the driving session 520 driving by the driver in the second scenario, wherein a second cognitive test is performed by the driver simultaneously with the driving; wherein said collecting data comprises: collecting, by a plurality of detection means, physiological data on the driver throughout the driving session; wherein the physiological data collected comprises at least one of: heart rate data, electroencephalogram (EEG) data, eye movement data, and respiration data; and collecting driver behaviour data.

15 Claims, 6 Drawing Sheets

(51) Int. Cl.
*B60W 50/14* (2020.01)
*G06V 20/59* (2022.01)
*G06V 40/16* (2022.01)
*G06V 40/18* (2022.01)

(52) U.S. Cl.
CPC ............ *G06V 40/161* (2022.01); *G06V 40/18* (2022.01); *B60W 2040/0872* (2013.01); *B60W 2420/403* (2013.01); *B60W 2540/22* (2013.01); *B60W 2540/221* (2020.02); *B60W 2540/225* (2020.02); *B60W 2540/229* (2020.02)

(58) Field of Classification Search
CPC ....... B60W 2540/22; B60W 2540/221; B60W 2540/225; B60W 2540/229; G06V 20/597; G06V 40/161; G06V 40/18
See application file for complete search history.

(56) References Cited

U.S. PATENT DOCUMENTS

2012/0133515 A1* 5/2012 Palshof ................. B60W 50/14 340/575
2015/0105641 A1* 4/2015 Austin ................. B60N 2/0023 600/300
2016/0148523 A1* 5/2016 Winston ................. A61B 5/162 434/236
2017/0039871 A1* 2/2017 Harkness ............... G09B 9/052
2020/0151474 A1* 5/2020 Zandi ...................... G06F 3/013
2020/0241525 A1 7/2020 Harbour
2022/0343762 A1* 10/2022 Alvarez ................ B60W 50/14
2023/0218159 A1* 7/2023 Eadie ................... A61B 3/0091 600/558

OTHER PUBLICATIONS

Cegovnik, T. et al., "An analysis of the suitability of a low-cost eye tracker for assessing the cognitive load of drivers," Applied Ergonomics, vol. 68, Apr. 2018, Available Online Oct. 31, 2017, 11 pages.

Govindarajan, V. et al., "Affective Driver State Monitoring for Personalized, Adaptive ADAS," Proceedings of the 2018 21st International Conference on Intelligent Transportation Systems (ITSC), Nov. 4, 2018, Maui, Hawaii, 6 pages.

Kim, A. et al., "Interrupting Drivers for Interactions: Predicting Opportune Moments for In-vehicle Proactive Auditory-verbal Tasks," Proceedings of the ACM on Interactive, Mobile, Wearable and Ubiquitous Technologies, vol. 2, No. 4, Dec. 27, 2018, 28 pages.

Prabhakar, G. et al., "Cognitive load estimation using ocular parameters in automotive," Transportation Engineering, vol. 2, Dec. 2020, 34 pages.

Shen, Y. et al., "CoCAtt: A Cognitive-Conditioned Driver Attention Dataset," ArXiv Cornell University Website, Available Online at https://arxiv.org/abs/2111.10014, Available as Early as Nov. 19, 2021, Last Revised Nov. 23, 2021, 10 pages.

Das, K. et al., "Detection and Recognition of Driver Distraction Using Multimodal Signals," ACM Transactions on Interactive Intelligent Systems, vol. 12, No. 4, Dec. 12, 2022, 26 pages.

European Patent Office, Extended European Search Report Issued in Application No. 23204529.4, Jan. 19, 2024, Germany, 13 pages.

Unni, A. et al., "Assessing the Driver's Current Level of Working Memory Load with High Density Functional Near-infrared Spectroscopy: A Realistic Driving Simulator Study," Frontiers in Human Neuroscience, vol. 11, No. 167, Apr. 5, 2017, 14 pages.

Nilsson, E. et al., "Let Complexity Bring Clarity: A Multidimensional Assessment of Cognitive Load Using Physiological Measures," Frontiers in Neuroergonomics, vol. 3, No. 787295, Feb. 8, 2022, 23 pages.

European Patent Office, Office Action Issued in Application No. 23204529.4, Mar. 19, 2026, Germany, 9 pages.

* cited by examiner

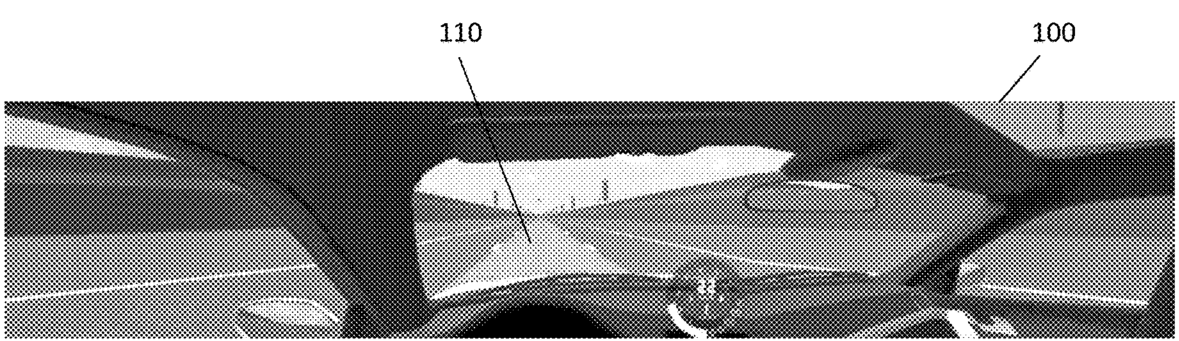
FIG. 1A
FIG. 1B
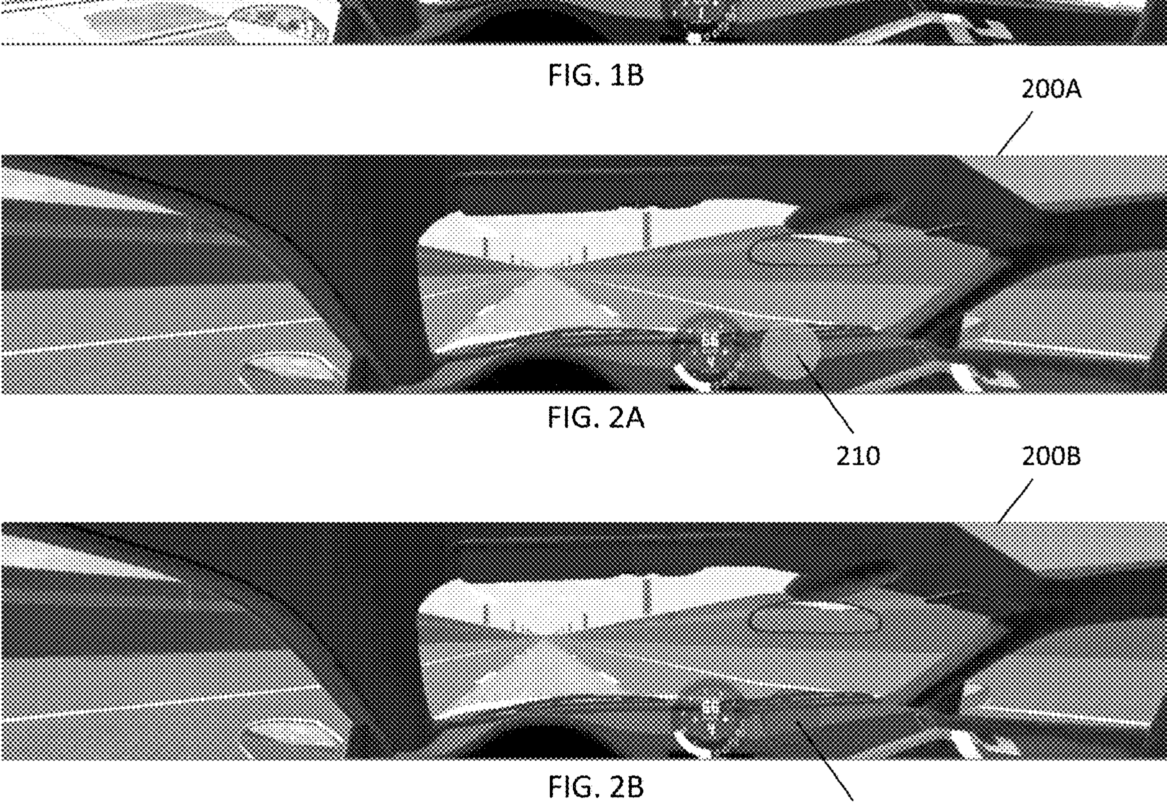
FIG. 2A
FIG. 2B

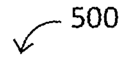

collecting data throughout a driving session in a car simulator, wherein the driving session comprises a plurality of driving stages comprising:
a first stage of driving by a driver in a first scenario;
a second stage of driving by the driver in a first scenario, wherein a first cognitive test is performed by the driver simultaneously with the driving;
a third stage of driving by the driver in a second scenario;
a fourth stage of driving by the driver in the second scenario, wherein a second cognitive test is performed by the driver simultaneously with the driving;
wherein each of the first and second cognitive tests is an N-back test; and wherein the first scenario is a relatively monotonous driving scenario comprising simulated highway driving and the second scenario is a relatively complex scenario comprising simulated urban road driving
510 collecting, by a plurality of detection means, physiological data on the driver throughout the driving session; wherein the physiological data collected comprises at least one of: heart rate data, EEG data, eye movement data, and respiration data 512 collecting driver behaviour data, comprising recording steer wheel activity of the driver, and recording the driver's reaction to the cognitive tests 514 analysing the physiological data and the driver behaviour data to determine a psychophysiological state of the driver during the driving session 520

FIG. 5

DRIVER PSYCHOPHYSIOLOGICAL STATE DETECTION

CROSS REFERENCE TO RELATED APPLICATIONS

The present application claims priority to Russian Application No. 2023107735, entitled "DRIVER PSYCHOPHYSIOLOGICAL STATE DETECTION", and filed on Mar. 30, 2023. The entire contents of the above-listed application are hereby incorporated by reference for all purposes.

TECHNICAL FIELD

Aspects of the present disclosure relate to advanced driver assistance systems (ADAS) and monitoring of human cognitive workload in the automotive industry.

BACKGROUND

Data plays an essential role in many machine learning-related projects, and is particularly needed in developing ADAS in the automotive industry. Research is carried out to investigate human engagement to driving conditions, through careful planning and/or control of lab-based or real-life driving experiments, detecting what mental effort is required of and applied by a human being for road-related cognition and other aspects of cognition, when driving. It is important to compile a large volume of data on human drivers' psychophysiological states and cognitive workloads while driving under monitored or controlled road conditions, environment conditions, levels of distraction, etc., that could be analysed in order to develop a driving monitoring systems in smart vehicles, for example.

The way in which such data is gathered needs to be thoroughly planned and carefully controlled. In previously known driving data collection experiments, biases can easily be inadvertently introduced, affecting the reliability of the data; processing and analysis of the data may become difficult or impossible, and no meaningful results may be derived.

There is therefore recognised a need to provide a new and optimised structure, protocol, and/or scenario for in-lab data collection sessions, for the sake of building a system for human psychophysiological state detection during driving and associated research.

SUMMARY

Through a process of optimisation that takes into account limitations imposed by engineering, human psychology and physiology, and resource management, a preferred way of carrying out consistent experiments to collect the psychophysiological state of a driver during driving has been developed by inventors, and described as follows.

In accordance with one of the aspects of the present disclosure, there is provided a method of collecting data for determining a psychophysiological state of a human driver, comprising: collecting data throughout a driving session in a car simulator, wherein the driving session comprises a plurality of driving stages comprising: a first stage of driving by a driver in a first scenario; a second stage of driving by the driver in a first scenario, wherein a first cognitive test is performed by the driver simultaneously with the driving; a third stage of driving by the driver in a second scenario; and a fourth stage of driving by the driver in the second scenario, wherein a second cognitive test is performed by the driver simultaneously with the driving; wherein said collecting data comprises: collecting, by a plurality of detection means, physiological data on the driver throughout the driving session; wherein the physiological data collected comprises at least one of: heart rate data, electroencephalogram (EEG) data, eye movement data, and respiration data; and collecting driver behaviour data, comprising: recording steer wheel activity of the driver; and recording the driver's reaction (i.e. the manner in which the driver reacts) in the cognitive tests; wherein each of the first and second cognitive tests is an N-back test; and wherein the first scenario is a relatively monotonous driving scenario comprising simulated highway driving and the second scenario is a relatively complex scenario comprising simulated urban road driving.

Optionally, wherein the plurality of driving stages further comprise a fifth stage of driving by the driver in the first scenario, wherein a third cognitive test is performed by the driver simultaneously with the driving; and a sixth stage of driving by the driver in the second scenario, where fourth and fifth cognitive tests are performed by the driver simultaneously with the driving; wherein each of the third and fifth cognitive tests are detection response tasks (DRTs), and wherein the fourth cognitive test is an N-back test.

Preferably, the each DRT comprises the driver reacting to the at least one visual stimulus as soon as possible, and wherein said recording the driver's reaction comprises at least one of: recording a response time of the user in reaction to the visual stimulus, a number of correct responses, and a number of incorrect responses in each DRT. Preferably, in each DRT the driver reacts to the at least one visual stimulus by physically pressing a button in the car simulator. Preferably, in at least one of the plurality of DRTs, at least one false stimulus is provided to the driver that the driver is instructed to ignore; wherein, preferably, the visual stimulus comprises a visual indication in a first colour, and the false stimulus comprises a visual indication in a second colour different from the first colour.

Preferably, in each N-back test the driver reacts by physically pressing a button in the car simulator.

Preferably, each of the plurality of driving stages has a time duration of between 4 and 6 minutes.

Preferably, the driving session takes place after a first period of rest by the driver for a first predetermined duration, and a second period of rest by the driver for a second predetermined duration takes place after the driving session.

Preferably, the method further comprises: collecting self-reported data from the driver before, during and after the driving session, the self-reported data comprising data on at least one of: the driver's psychological state, physical state and prior sleep conditions: preferably, the self-reported data is provided by the driver in the form of at least one questionnaire. Preferably, collecting self-reported data comprises: collecting first self-reported data before the first period of rest; collecting second self-reported data between successive driving stages during the driving session (for example, after each of the plurality of driving stages); and collecting third self-reported data after the second period of rest.

Preferably, the plurality of detection means comprises at least one of: ECG apparatus for obtaining heart rate data, EEG apparatus for obtaining EEG data, at least one eye-tracking camera for obtaining eye movement data, at least one camera for obtaining video data of the driver's face, and at least one photoplethysmography sensor to collect blood circulation data.

The method further comprises, optionally: analysing the physiological data and the driver behaviour data (and optionally the self-reported data) to determine a psychophysiological state of the driver during the driving session; and/or analysing the physiological data and driver behaviour data through storing the collected data in a memory and/or sending the collected data to a processor for analysis; and/or storing results of the analysis and the collected physiological data and the collected driving behaviour data in a database and using the database as training data for a machine-learning algorithm to predict or estimate the psychological state of a driver when driving.

In accordance with another one of the aspects of the present disclosure, there is provided a system for collecting data for determining a psychophysiological state of a human driver, comprising: means for collecting data throughout a driving session in a car simulator, wherein the driving session comprises a plurality of driving stages comprising: a first stage of driving by a driver in a first scenario; a second stage of driving by the driver in a first scenario, wherein a first cognitive test is performed by the driver simultaneously with the driving; a third stage of driving by the driver in a second scenario; and a fourth stage of driving by the driver in the second scenario, wherein a second cognitive test is performed by the driver simultaneously with the driving; wherein the means for collecting data comprises: a plurality of detection means for collecting physiological data on the driver throughout the driving session; wherein the physiological data collected comprises at least one of: heart rate data, electroencephalogram (EEG) data, eye movement data, and respiration data; and means for collecting driver behaviour data, comprising: means for recording steer wheel activity of the driver; and means for recording the driver's reaction to the cognitive tests; wherein each of the first and second cognitive tests is an N-back test; and wherein the first scenario is a relatively monotonous driving scenario comprising simulated highway driving and the second scenario is a relatively complex scenario comprising simulated urban road driving.

BRIEF DESCRIPTION OF THE DRAWINGS

FIGS. 1A and 1B are illustrations showing views under two different scenarios seen by a driver in a car simulator in accordance with an example.

FIGS. 2A and 2B are illustrations showing other views seen by a driver in a car simulator in accordance with an example.

FIG. 5 is a flow chart for a method in accordance with an example.

DETAILED DESCRIPTION OF THE INVENTION

Figures 3A, 3B:
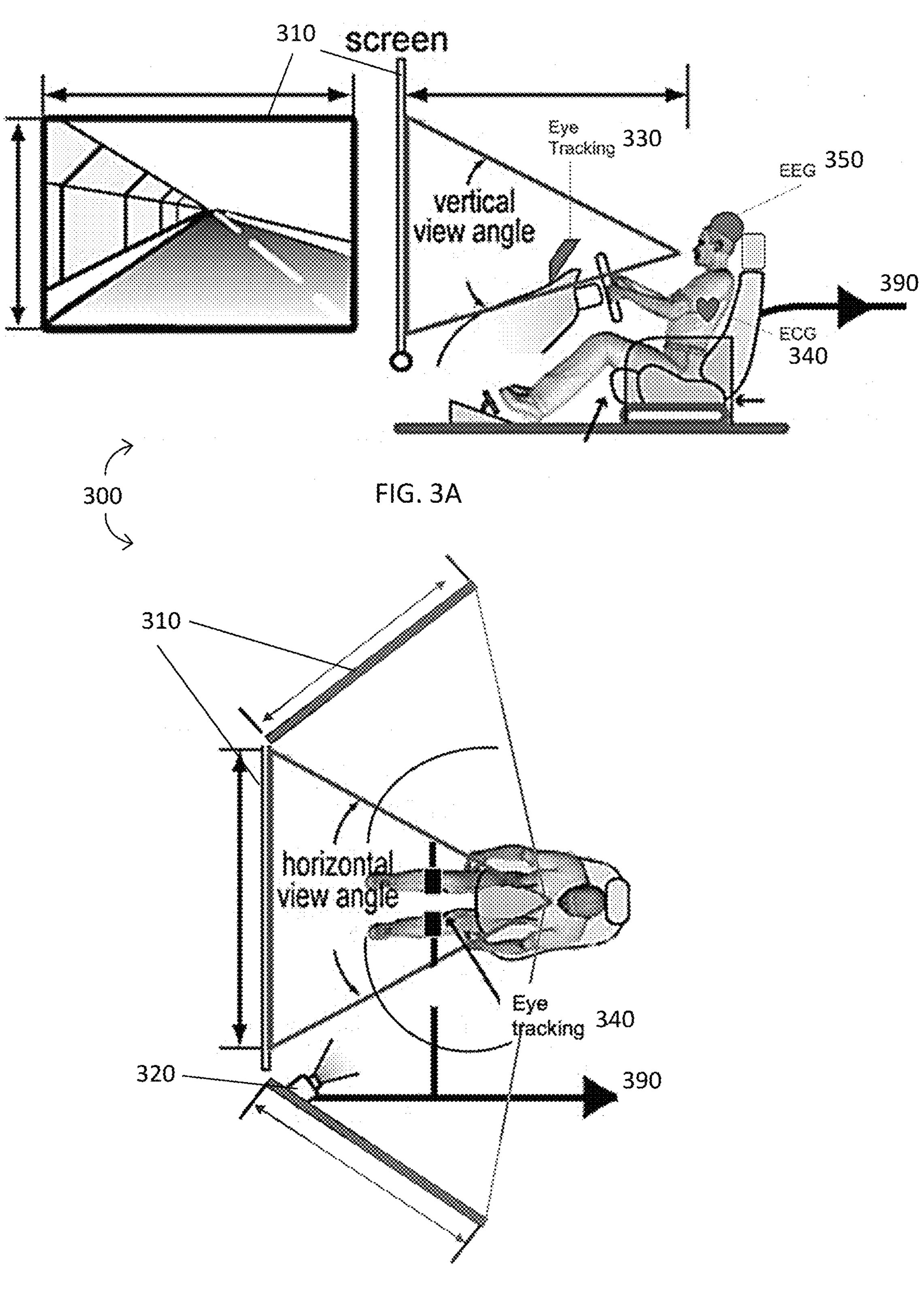
FIGS. 3A and 3B are schematic diagrams (side view and bird's eye view, respectively) showing experimental apparatus in accordance with an example.

It is herein disclosed a method or protocol for sessions conducted to consistently generate and collect data in relation to a human test subject when driving.

A test session may be structured in three parts: an introductory phase comprising preparatory actions, such as letting the subject wear monitoring equipment (e.g. an ECG monitor); the main bulk of the experiment comprising a sequence of data collection phases; and a concluding phases comprising post-experiment actions, such as helping the subject take off monitoring equipment.

The experiment takes the form of a laboratory-based session, making use of a car simulator. The simulator may need to be configured prior to the experiment.

In the main data-collection phase of the experiment itself, various data relating to the human subject's psychophysiological state is collected, by sensing/monitoring/data-collection means. These typically involve sensors/detectors/monitors that attached to the subject's body to collect bio-signals, and those that are located in the subject's environment.

In carrying out sessions consistently and carefully according to a pre-defined protocol, reliable data can be assembled for exploring human psychological and physiological states when engaged in driving a vehicle in connection with environmental and road conditions, useful in the automotive industry and beyond. Such data can illuminate the levels and types of cognitive load induced by driving and internal cognition, stress induced by the same, and levels of drowsiness (or of alertness).

A testing protocol in a simulated driving environment is now described with respect to an exemplary embodiment. It has been identified by the inventors to be an optimum protocol, in terms of balancing various factors and constraints, including demands on the test subject (he will be overly tired in an overly long experiment), need for sufficient and reliable data (the experiment cannot be too short because sufficient volumes of data needs to be collected, and also because human mental states normally takes time to change), limitations on the equipment (e.g. configuration or processing time required outside and inside of the experiment duration), cost of running an experiment (an unnecessarily long experiment wastes resources).

Possible variations in the protocol are discussed. Different aspects, elements and preferences for each type or category of experimental protocols disclosed herein may be combined or interchanged; all logical combinations and changes of elements and aspects between examples are considered to be within the scope of disclosure.

Driving and Cognitive Tests

In an exemplary example, described with reference to FIGS. 1A, 1B, 2A, 2B, 3A and 3B, a plurality of simulated driving scenarios (environments) are provided to a participating driver. This may comprise a driving simulator 300, comprising one or more screen(s) 310 operable to show a simulated view 100 of one or more roads, and a plurality of features corresponding to an automotive vehicle including, most importantly, a driver's seat and steering wheel. Some features may either be provided virtually on the screen(s), such as a speedometer.

The plurality of simulated driving scenarios into which the driver is put may different levels of complexity due to different (simulated) environmental conditions, reflecting different levels of cognitive load required of or imposed on the driver. Preferably, the scenarios comprise (1) an "endless track" or "highway driving" scenario, and (2) an "urban driving" or "city track" scenario. For scenario (1), the protocol to be followed by the driver may involve driving on an endless track, simulating an instance of highway driving. It is desired that part of the experiment investigates the driver's responses when under monotonous conditions, such as a driving environment that is intended to be monotonous and almost featureless, to the point that the driver experiences drowsiness of varying levels and even to the point of sleep. For scenario (2), the driving environment is relatively more complicated and is not monotonous, and various features and obstacles such as traffic lights, crossings, other vehicles, pedestrians, etc. may be present, and the driver needs to make use of decision-making faculties multiple times.

The driver is instructed to sit down on the seat of the simulator and look at the screen(s) 310 as though in a real car looking out of the windscreen ahead. An example of the scenario seen by the driver is shown in FIGS. 1A and 1B, corresponding to the highway driving scenario and the urban driving scenario, respectively. He (or she) may be instructed to drive non-stop i.e. constantly, for the duration of the experiment. Such constant driving means the driver is in a road driving situation continuously without taking breaks from such a situation; it does not mean the simulated car is non-stop, as there may be points at which it stops at a traffic light, for example.

In the endless track scenario, the driver may be instructed to drive only on an indicated lane. The indication may be in the form of highlighting, i.e. the correct lane is highlighted 110, e.g. in yellow; preferably, no other additional signals about lane changes are needed. The drive may be instructed to change to a different lane in response to a lane change indication being shown on the screen when this occurs; for example, the new lane being highlighted in yellow instead of the current lane.

In the urban scenario, the driver may be instructed to follow a route through the simulated landscape/cityscape along a route marked with signs, such as red vertical marks.

At the same time as the above is happening, the driver may be instructed to keep obeying the rules of the road and speed limits (e.g. 45 mph or 72 km/h) where applicable. The driver may be reminded that driving safety remains the main priority.

In addition to driving, the test protocol requires the driver to perform a plurality of cognitive tests. These may serve as mental exercises that require instances of active decision-making (as opposed to an intuitive/unconscious reaction), revealing information on the driver's cognitive load, through reaction times, and the frequency of correct and incorrect responses, for example.

The driving protocol may comprise two stages, each corresponding to each of the above two scenarios. In each stage, while driving, the test driver is asked to take a working memory test, preferably an N-back test, providing his response/input on test input means in the simulator, such as a button located on or near the steering wheel, or on the panel.

There may be one or more additional stages, preferably at the end, and preferably involving an endless track scenario, when the driver may be instructed to take at least one reaction time test(s) or detection response task(s) (DRTs).

The N-back test is an auditory-verbal test used to shape the cognitive load in the experiment, i.e. impose graded levels of cognitive load of the test subject. It may be modified to minimise physiological signal interference due to speech. The participant is presented with a set of vowels of the alphabet (e.g. English or Russian, a language understood by the participant). When a particular letter he (or she) needs to quickly determine when (or whether) he has previously heard this letter and how many positions back.

Preferably more than one types of N-back tasks are used, as illustrated in the following examples:

1-back task (low cognitive load): the participant is asked to react (press a button on the steering wheel) each time two identical letters appear back to back, e.g. the first letter heard is "A" and the second is "A", i.e. the same letter has already been sounded one position back.

2-back task (higher cognitive load): the participant is asked to react (press the button on the steering wheel) each time two identical letters appear in a pair separated by one other letter in between, e.g. the first letter heard is "A", the second is "O", and the third is "A" again, i.e. the same letter has already been sounded two positions back.

3-back task (highest cognitive load): the participant is asked to react (press the button on the steering wheel) each time two identical letters appear in a pair separated by two other letters in between, e.g. the first letter heard is "A", the second is "O", the third is "Y", and the fourth is "A" again, i.e. the same letter has already been sounded three positions back.

The participant is preferably instructed to not interrupt driving when performing such responses.

In one example, in a five-minute section of simultaneous N-back tests and driving, a sequential combination of 1-back tasks (2 times), 2-back tasks (2 times) and 3-back task (1 time) are combined.

In one example, letters in each sequence may comprise 10 letters. In one example, letters may be pronounced at intervals of about 2.5 seconds (e.g. between 1.5 and 3 seconds), for an overall duration of approximately 25 seconds (e.g. between 15 and 30 seconds). In an alternative example, letters sequences may be pronounced with about 1.5-second intervals of letter sound and about 1.5-second time periods for receiving the answer (response) from the test participant.

In a DRT, the task for the participant is to react in a certain way as soon as possible to a stimulus. In an exemplary DRT, this stimulus may take the form of an indication 210 that appears on the screen(s) of the simulator. For example, the indication may be a sign, e.g. a green circle, appearing at the bottom right corner of the screen, next to the speedometer. For example, the participant may be tasked to react by pressing a pedal, e.g. the right pedal under the steering wheel, or alternatively pressing a button provided somewhere in the simulator (e.g. on or near the steering wheel, on the dashboard/panel).

Other indications or signs may appear during the DRT to serve as distraction. For example, if a red circle 220 lights up instead of (or in addition to) the green circle, the driver should not react and simply ignore the red circle, as the green circle is the only correct actionable stimulus.

Exemplary DRT Settings Include:

The number of green (action) lights is greater than the number of red (stop) lights in the set (e.g. 12 green and 25 red lights).

Intervals between successive stimuli are random, within a predetermined range (e.g. 3000 to 5000 ms, in steps of 1000 ms).

Order of appearance of green and red lights is random.

DRT measurements are sensitive to the test subject's overall mental workload, and DRT metrics are used to differentiate attentional loads. Normally, three DRT variants can be used: Head-mounted DRT (HDRT), Remote DRT (RDRT), and Tactile DRT (TDRT). In the present experiment protocol, the DRT stimulus is visually presented. DRT performance includes three metrics: response time, number of false alarms, and number of passes.

The Test Session

The testing protocol and thus its results are optimised to ensure the lack of cognitive distraction, undue influences and implications, and psychological biases. Distractions should be avoided or at least minimised; the subject may thus be instructed to avoid activities that influence alertness when driving, in the different road conditions. For example, the subject may be instructed not to talk with another person (e.g. on a phone) or listen to music while driving. Furthermore, conversations shortly before the driving starts, especially anything that may create a bias in the subject's mind as to his upcoming experience or feelings (e.g. of tiredness), are preferably also be avoided. Rate of success in collection of reliable, clean data is therefore improved.

Experimental timings—total duration of the experiment, duration of the main driving process, duration of the DRT tasks, etc. —are of importance. For example, in the presently disclosed protocol there may be a total duration of about 30 minutes of driving (interspersed with stage of filling in questionnaires/submitting self-assessed data, in accordance with the breakdown in Appendix 1). This has been identified by the inventors as striking a balance between abundance and reliability of data collected, against equipment limitations and cost; there are multiple factors that affect the total duration that the driver is asked to drive for, for example. These factors may concern limitations imposed by engineering, human psychology and physiology, which need to be taken into account during an optimisation process. For example, if the duration of driving is unduly shortened, one may have to make assumptions that human mental/cognitive states switch instantaneously, which would negatively affect the quality of subsequent analysis.

Multiple aspects of cognitive load that could affect driving performance, such as road environment complexity and additional non-driving-related task(s) e.g. N-back test are included in the experiment for control and investigation. Both the simple highway driving and urban driving scenarios may be designed with BeamNG.

In the simple highway driving scenario, the road environment may be flat and desert-like, with no passing traffic, to provide a relatively monotonous sensory experience. In the urban driving scenario, a road environment with passing traffic, modelled on a large busy city (e.g. San Francisco) may be used. There is preferably no special feedback on driving errors, but in cases of accidental vehicle damage on long-term speeding, the car may be forcibly stopped (rebooted). The participant may resume moving forward again.

There is preferably no special feedback on driving errors, but in cases of accidental vehicle damage or long-time speeding, the car may be forcibly stopped (rebooted). The participant may resume moving forward again.

An example of the experimental protocol, involving events and their timings, is provided in Appendix 1. This protocol including parameters such as length of each phase and test, and the order in which the phases/tests are carried out, has been identified by the inventors as an optimum or particularly preferable method of driving data collection. However, departures from the values indicated in Appendix 1 are possible without affecting the reliability of the data acquired.

As shown in Appendix 1, there are 6 separate driving stages, each followed immediately by providing self-reported data by the driver, which may comprise filling in a questionnaire (type 2, explained below). A type 1 questionnaire may also be submitted at the beginning and a type 3 questionnaire at the end.

In the last two driving stages, the participant may have to perform driving and the DRT test simultaneously, and/or driving, the N-back test, and the DRT test simultaneously.

In some examples, there may be more than one DRT tests in each driving stage, and/or more than one N-back tests in each stage.

The number of driving stages may be other than 6. For example, it may be 4, 5, 6, 7, or 8.

Preferably, the duration of each driving stage may be predetermined. In one example, the length of all driving stages are the same, e.g. about 5 minutes (between 4 and 6 minutes or between 4.5 and 5.5 minutes). In the present exemplary protocol, before the driving test, there may be a calibration stage.

The calibration stage may comprise multiple calibrations. Instructions are preferably provided to the subject by the system (e.g. verbal instructions sounded through a sound system). Preferably, there are three calibrations.

For example, in a first calibration stage, a "breathing calibration", the subject may be instructed to turn the wheel in one direction (e.g. right/clockwise) while inhaling and in the other direction (e.g. left/anticlockwise) while exhaling, or vice versa. The degree of rotation is for example 30 to 60 degrees; no more is required. The subject may be asked to take fast deep inhalations at first, and to breathe calmly, at the same time rotating the wheel as required.

For example, in a second calibration stage, the subject may be required to follow a visual indication (e.g. a dot) appearing in different places with his eyes. For example, he may be asked to first look at the dot via head movement i.e. turning his head to follow the dot, then to keep his head still and follow the dot by moving his eyes only. This "dot calibration" stage is preferably repeated at the end of the experiment.

For example, in a third calibration stage, the test subject may be instructed to look at different objects in his environment, such as the speedometer located in the right-hand corner of the central screen of the simulator, or the side mirror(s).

Separately, there may be a rest stage. This may comprise two parts. In a first part, the subject may be asked to watch a video. In a second part, he may be asked to sit with eyes closed.

The driving section of the experiment protocol follows. As mentioned, this preferably comprises a first part under an endless road scenario, where the driver is instructed to drive along a highlighted lane. The endless road may be empty and straight. The second driving part is preferably within an urban scenario, where the driver is instructed to drive on city roads along marks (e.g. red vertical marks), and to follow all driving rules such as traffic lights, stop signs, switching on turn signals.

In the simulation, during the driving stages, the simulated car may be "renewed" if, for example, there is a car crash, the driver leaves the route, or he (or she) does not comply with the speed limit for an extended period of time.

At the beginning of the experiment, the participant may be introduced to the simulator environment for a short period, e.g. about 3 to 5 minutes. Apart from this introductory period and the actual driving period, there may also be a final rest period, in the following order:

rest period of about 5 minutes (baseline session);

simulated driving (urban and highway driving sessions, some with simultaneous cognitive task(s));

rest period of about 5 minutes (end session).

Apart from being asked to drive and having his data collected, the driver may be asked to fill in one or more questionnaires for each experiment. Preferably, he may be asked to rate, in a type 2 questionnaire, his:

drowsiness on a 9-level Karolinska Sleepiness Scale (KSS);
cognitive load (NASA task load index (NASA-TLX));
emotional arousal and valence (self-assessment manikin (SAM) assessment);
stress level before and after each stage of the driving experiment.

In other words, the subject is preferably instructed to provide self-assessed data, subjectively rating his own psychological state based on his knowledge or perception related thereto, e.g. previous sleep quality, current level of tiredness or stress.

Further Experimental Preparations and Precautions

Before the experiment, in some examples, the following preparations may be asked of the participating driver:
have a good, usual amount of night sleep before the day of the experiment;
avoid consumption of foods and drinks that contain caffeine and any drowsiness-causing medications for at least 8 hours before the experiment;
avoid alcoholic beverages for at least 24 hours before the experiment;
avoid smoking or physical exertion for at least 2 hours before the experiment.

Explicit consent may be obtained from the driver for taking part in the experiment voluntarily and having his data collected. Other checks as to general health, neurological well-being, vision (e.g. colour blindness), any medication being taken (e.g. psychoactive medication), language skills and driving license status (e.g. at least one year from driving license acquisition) may also be done.

To prevent any unwanted effect that the circadian rhythms of the driver may have on the experiment and interfere with his drowsiness level or mental state, the experiment is preferably performed during predetermined times in the morning and/or afternoon. For example, it has been suggested 3 pm is the afternoon sleepiness peak in the human circadian rhythm, so the experiment may be timed accordingly to make use of or avoid that time.

The environment in which the driving simulator and the participant are situated and monitored is preferably a quiet and dark room maintained at a preferred temperature e.g. approximately 23° C. Environmental conditions such as humidity and temperature may be monitored and form part of the group of data collected from the session.

Processing of Collected Data

In accordance with any of the above disclosure, data can be collected in a consistent way following a predetermined test protocol, for exploring mental states of a driver in connection with environmental and road conditions.

The data, after being collected by the detection/data collection means such as medical sensors, monitors and cameras, may be transmitted to suitable processing means (e.g. computer processor, microprocessor, server in a computing system) and storing means (e.g. a memory in the system). The data may be analysed by the processing means, in order to determine the psychophysiological state of the subject. The results can be useful in informing the development of assisted driving software and hardware, such as serving as training data for machine-learning algorithms for determining the psychological state of a driver in correlation with his (or her) observable bio-signals, data on response to distractions and mental exercise, and vehicle data.

Apparatus and Environment Configuration

The apparatus used in the experiment according to the present embodiment is now described.

The in-lab experiment is preferably performed through a fixed-base driving simulator 300 (such as one developed with BeamNGpy library (BeamNG.tech)).

It preferably includes a part of a car with conventional in-vehicle equipment such as a driver's seat, steer wheel, pedals and gear lever. Some may be omitted if considered unnecessary for an experiment. The simulator setup also preferably includes one or more screens 310 in front of the driver. For example, these comprise three LED monitors. For example, among the pedals, the right pedal is the gas and the middle one is the brake. For example, it has an automatic transmission. For example, if the driver keeps pushing the brake pedal after the car stops, the car goes in reverse.

A computer with high processing capability is preferably synchronised with components of the simulator to record the driver's steer wheel activity and the vehicle's location in a coordinate system (x, y, and z-axis), for example. It also preferably generates pictures on the monitors 310 in front of the driver.

Temperature and lighting of the room where the simulator is situated may be controlled during the experiment.

Preferably, monotonous car engine sounds are continuously played in the background during the driving, at least during the endless driving section.

The experimental setup further includes a plurality of sensing equipment, such as sensors, detectors and cameras, to collect data related to the human driver, comprising bio-data and beyond. Some may be installed fixedly in the simulated driving environment; some may be attached to the participant's body. The following apparatuses may be included in the setup:
a plurality of (e.g. three) video monitors 310 for displaying image(s) to the subject;
a driver's seat;
a plurality of cameras 320 to monitor the subject;
a plurality of (e.g. two) eye-tracking cameras 330 (e.g. Smart Eye);
a plurality of (e.g. two) photoplethysmography sensors in watches to be worn by the subject (e.g. Samsung Watch) to collect blood circulation data;
an ECG-telemetry system 340 with chest electrodes and the respiration curve measurement with a strain-gauge type pickup sensor to be worn by the subject (e.g. Zephyr Technology, BioHarness);
an EEG-recording system 350 with a 10 to 20-electrode system to be worn by the subject (e.g. Enobio);
one or more (e.g. two) conventional laptop PCs.

Some of the above are illustrated in the schematic diagrams FIGS. 3A and 3B which show an example of the simulator setup.

The plurality of sensing/detection/measurement means may be thought of as falling into two groups: primary sensors, which are used as a source of information in a production-like environment, e.g. a camera that captures the subject's facial features to help determine his level of drowsiness, which is the focus of the experiment; and secondary sensors, which are auxiliary detectors for better understanding the state of the subject or of the environment he is in, such as an EEG sensor for providing additional information about the human's physiological state, or a humidity sensor for collecting environmental information. Collection of data by all the separate components is synchronous.

Data Collection and Analysis

The human physiological data collected during the experiment includes at least one of: Heart rate/electrocardiogram (ECG):

a. This can be collected by sensors such as wearable body sensors/monitors, such as watches, straps, patches, harnesses, shirts, etc. with sensing capabilities (e.g. Zephyr sensor, Samsung watch sensor). This can also be collected using remote photoplethysmography (rPPG) using video equipment monitoring the driver's face.

Brain signals/electroencephalogram (EEG).

Eye movements.

Respiration.

More specifically, parameters of interest that could be collected, measured, or derived from collected data include one or more of:

RR intervals from the ECG;

respiration waveform;

respiration rate calculated from the peak-to-peak interval of the respiration curve;

EEG signals;

right-and-left eye gaze;

eyelid closure.

Examples of collection of particular types of data are described below.

EEG (electroencephalogram) equipment and data collection: The EEG signals may be recorded with a 32-channel ENOBIO device following the international 10-20 system. The raw EEG signal data may be recorded at a 500 Hz using a portable EEG cap. The earlobe electrode may be a signal reference, one channel may be used for EOG correction, one channel for electric reference, and three channels accelerometer with sampling rate at 100 Hz.

ECG (electrocardiogram) equipment and data collection: ECG and RR-intervals (the time periods between consecutive heartbeats) may be measured using a miniature ECG sensor (e.g. BioHarness, at sampling rate 1000 Hz, by Zephyr Technology, Annapolis, MD, USA). The subject may wear a special chest belt with two electrodes that are located in the first and second chest leads. Batch data transmission from the sensor to a mobile device may be carried out through a wireless protocol e.g. Bluetooth.

Eye gaze recording equipment and data collection: Eye gaze data may be recorded using a wearable eye gaze tracker (e.g. commercially available eye gaze tracker Smart Eye DR120). Two cameras for gaze tracking may be installed within a horizontal bar attached to the bottom of the central screen above the steering wheel, to measure eye data samples at 120 Hz, although these are preferably down-sampled to 60 Hz by software.

Face video recording: To capture face expressions from the driver, a web camera (e.g. Logitech webcam) may be used, pointed straight at the participant from the screen, capturing video at 30 frames-per-second (FPS). Preferably, for the analysis of rPPG, the camera may be positioned to capture the driver's whole head and upper torso with sufficient margins to keep the face in view, as he may show normal forward-oriented movements while driving. Preferably, the video capture is in black and white and the video resolution is 1920×1080.

Non-physiological data are also measured and collected in the simulator.

A high cognitive load significantly increases the inattentional blindness and deafness of drivers to stimuli that are both relevant and irrelevant to driving. Accordingly, to characterise driving performance, the following mistakes committed by the driver may be recorded as data for analysis:

exit into the opposite lane;

entry to the marking line;

speeding over the speed limit.

According to the cognitive control hypothesis, cognitive load selectively impairs driving sub-tasks that rely on cognitive control but may leave automatic performance unaffected. Therefore, to characterise driving performance continually during driving, the follow metrics may be recorded and/or calculated as data for analysis:

lateral position, and standard deviation thereof;

steering wheel movements, and standard deviation thereof;

average speed of vehicle;

standard deviation of speed.

Data collected at different components of the experimental set up may be transmitted via transmission means (represented by thick arrows 390 in FIGS. 3A and 3B) to storing means and/or processing means such as a computer, a server and/or a processor, such as the aforementioned laptop(s).

System

Figure 4:
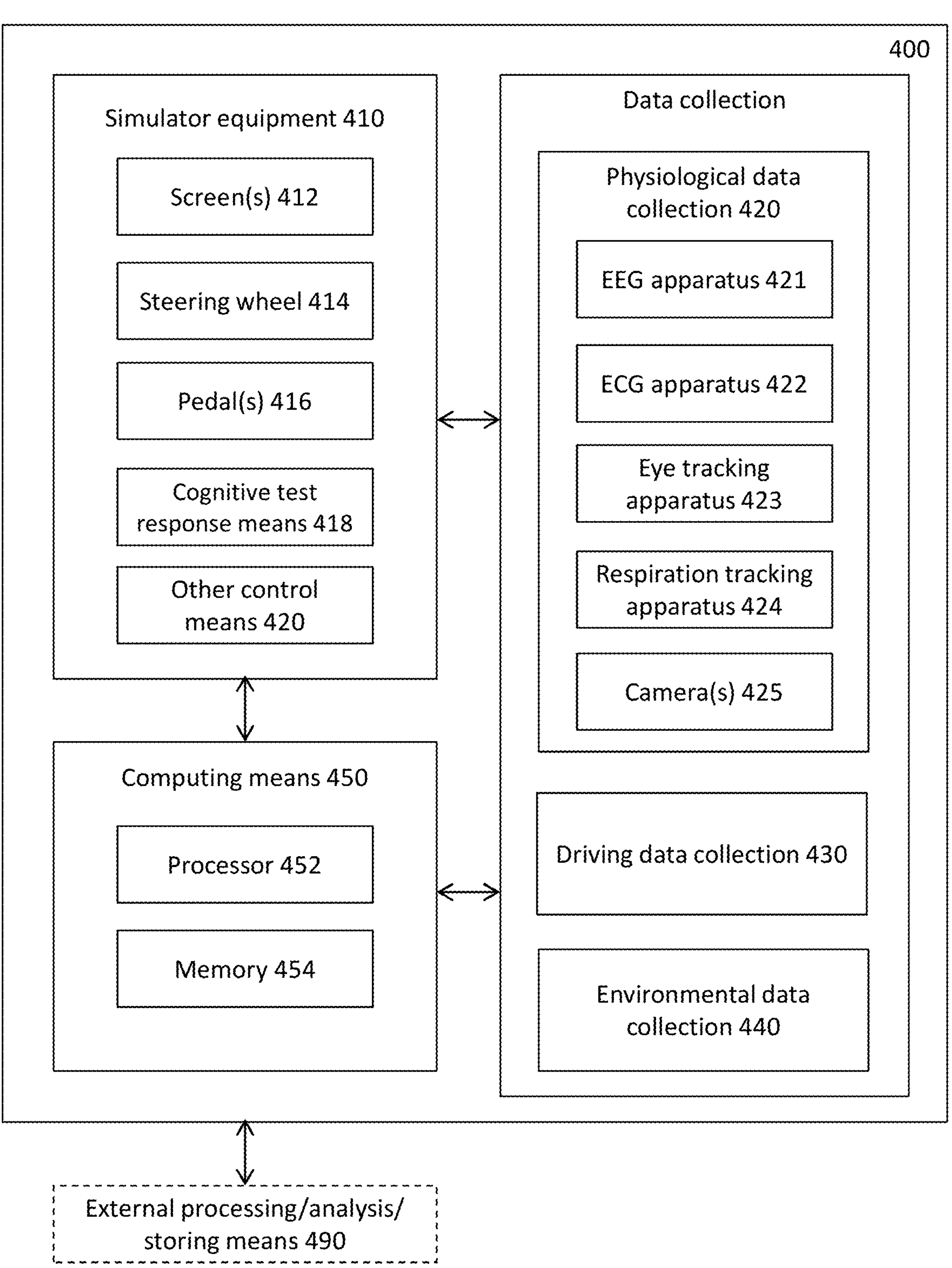
FIG. 4 is a block diagram for a system in accordance with an example.

In accordance with one embodiment, FIG. 4 depicts a block diagram for a system for carrying out a driving test to collect data on the driver with a view to understand the driver's mental state under controlled driving conditions, such as those represented in a monotonous highway driving scenario and a relatively complex urban street driving scenario.

The system preferably comprises a car simulator 400. The simulator preferably comprises equipment 410, including one or more screen(s) 412, steering wheel 414, pedal(s) 416, cognitive test (e.g. DRT, N-back) response/input means 418 such as one or more button(s) through which the user reacts to the tests, 416 and means of controlling the simulator such as its temperature (air conditioner), humidity and background sound/noise (e.g. speakers) 420.

It may also comprise data collection means, including means for obtaining/detecting/measuring physiological data 420 of the driver, means for obtaining/detecting/measuring driving (driver behaviour) data 430, and means for obtaining/detecting/measuring simulator environment data 440.

The physiological data collection means 420 may include EEG apparatus 421, ECG apparatus 422, eye tracking apparatus 423, respiration tracking apparatus 424, at least one camera(s) 425, and other further sensors (not illustrated).

The system may also comprise computing means 450, which includes at least one processor(s) or (micro) processor (s) 452, and storing means (memory) 454. The processor(s) may be responsible for performing analysis on collected data. Alternatively, analysis may be performed in external computing means.

The various components and means within the simulator system are preferably connected to each other and operable to communicate with one another.

Optionally, there is provided external processing, analysis and/or storing means 490, such as a server, processor and/or memory, for performing at least part of the processing, analysis and/or storage. This is connected to the car simulator.

Some of the above components may be optional.

Methods

FIG. 5 is a flow chart illustrating a method 500 disclosed in accordance with one of many aspects of the present disclosure. The method includes step 510: collecting data in a car simulator, wherein the driving session comprises a plurality of driving stages comprising a first stage of driving by a driver in a first scenario, a second stage of driving by the driver in a first scenario wherein a first cognitive test is performed by the driver simultaneously with the driving, a third stage of driving by the driver in a second scenario, and a fourth stage of driving by the driver in the second scenario wherein a second cognitive test is performed by the driver simultaneously with the driving, wherein each of the first and second cognitive tests is an N-back test, and wherein the first scenario is a relatively monotonous driving scenario comprising simulated highway driving and the second scenario is a relatively complex scenario comprising simulated urban road driving; this step comprises step 512: collecting, by a plurality of detection means, physiological data on the driver throughout the driving session; wherein the physiological data collected comprises at least one of: heart rate data, electroencephalogram (EEG) data, eye movement data, and respiration data, and step 514: collecting driver behaviour data, comprising recording steer wheel activity of the driver and recording the driver's reaction to the cognitive tests. The method subsequently includes, optionally, step 520: analysing the physiological data and the driver behaviour data to determine a psychophysiological state of the driver during the driving session.

Figure 6:
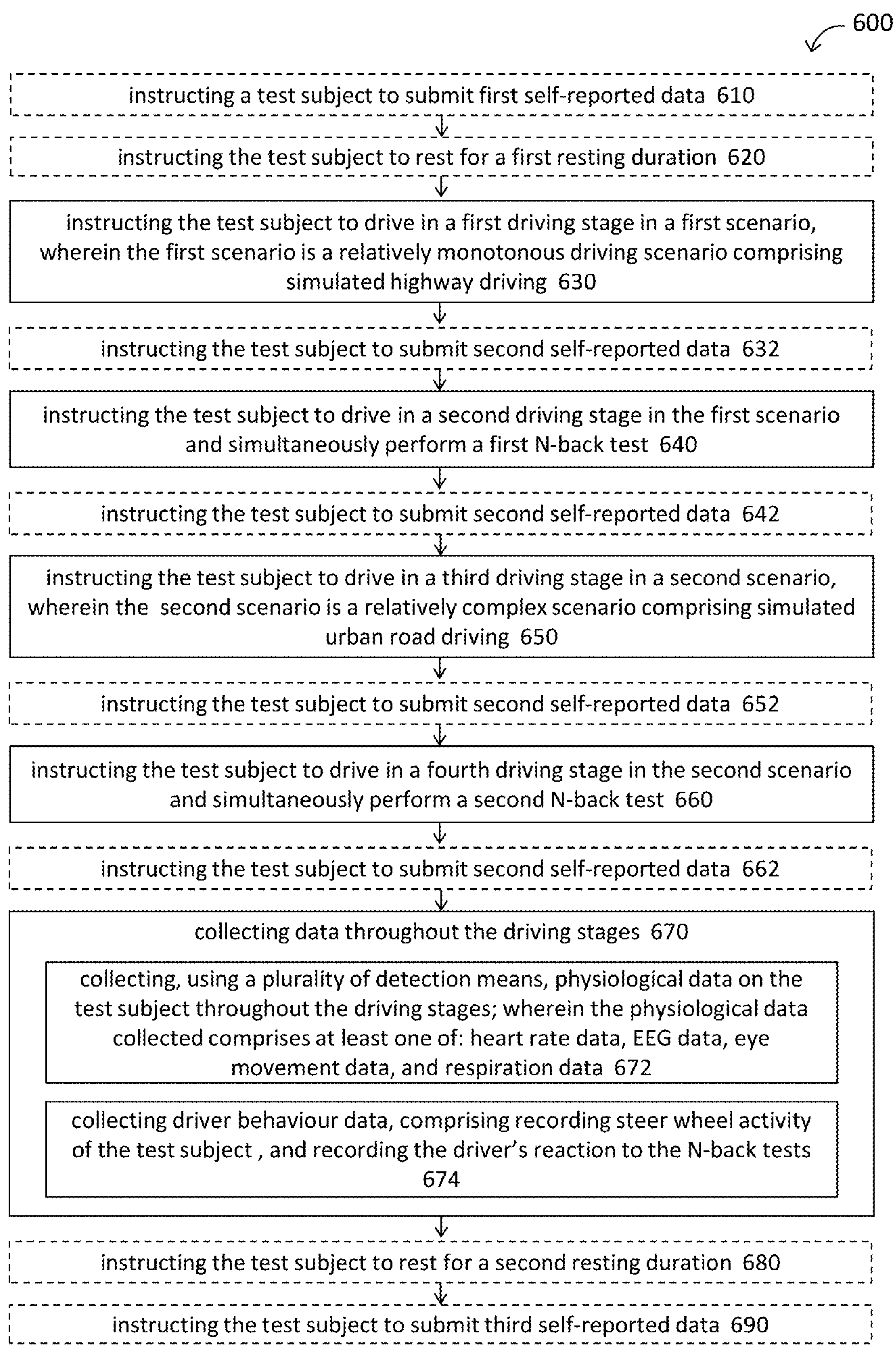
FIG. 6 is a flow chart for a method in accordance with another example.

FIG. 6 is a flow chart illustrating a method 600 in accordance with another aspect of the disclosure. The method comprises optional step 610: instructing a test subject to submit first self-reported data (e.g. using a first questionnaire); optional step 620: instructing the test subject to rest for a first resting duration; step 630: instructing the test subject to drive in a first driving stage in a first scenario, wherein the first scenario is a relatively monotonous driving scenario comprising simulated highway driving; optional step 632: instructing the test subject to submit second self-reported data (e.g. using a second questionnaire); step 640: instructing the test subject to drive in a second driving stage in the first scenario and simultaneously perform a first N-back test; optional step 642: instructing the test subject to submit second self-reported data (e.g. using another second questionnaire); step 650: instructing the test subject to drive in a third driving stage in a second scenario, wherein the second scenario is a relatively complex scenario comprising simulated urban road driving; optional step 652: instructing the test subject to submit second self-reported data (e.g. using yet another second questionnaire); step 660: instructing the test subject to drive in a fourth driving stage in the second scenario and simultaneously perform a second N-back test; optional step 662: instructing the test subject to submit second self-reported data (e.g. using yet another second questionnaire); step 670: collecting data throughout the driving stages, comprising sub-step 672: collecting, using a plurality of detection means, physiological data on the test subject throughout the driving stages; wherein the physiological data collected comprises at least one of: heart rate data, EEG data, eye movement data, and respiration data, and sub-step 674: collecting driver behaviour data, comprising recording steer wheel activity of the test subject, and recording the test subject's reaction to the N-back tests. The method further comprises optional step 680: instructing the test subject to rest for a second resting duration, and optional step 690: instructing the test subject to submit third self-reported data (e.g. using a third questionnaire). In this method, the driving test takes place in a car simulator.

Figure 7:
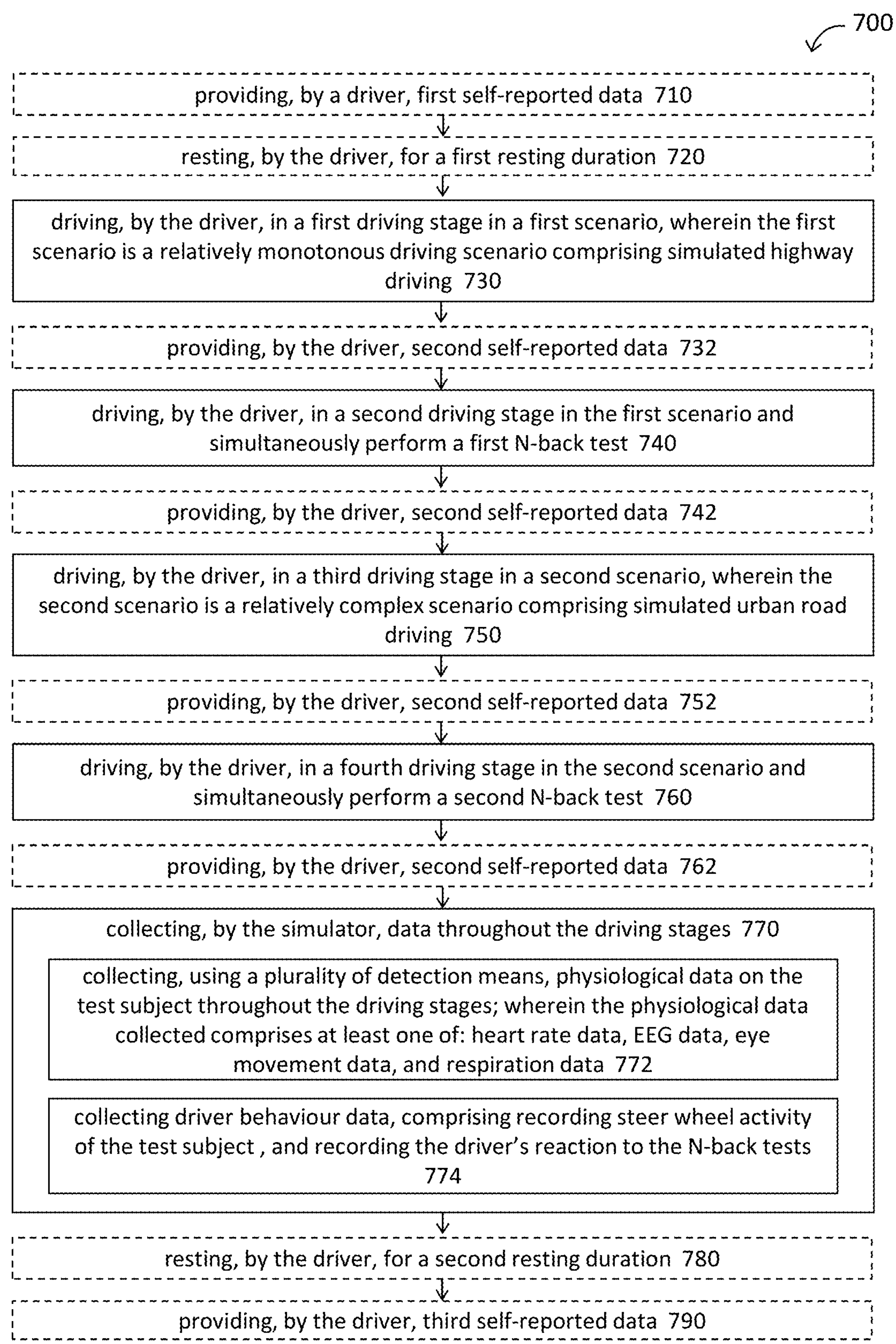
FIG. 7 is a flow chart for a method in accordance with another example.

FIG. 7 is a flow chart illustrating a method 700 in accordance with another aspect of the disclosure. The method comprises optional step 710: providing first self-reported data (e.g. using a first questionnaire); optional step 720: resting for a first resting duration; step 730: driving in a first driving stage in a first scenario, wherein the first scenario is a relatively monotonous driving scenario comprising simulated highway driving; optional step 732: providing second self-reported data (e.g. using a second questionnaire); step 740: driving in a second driving stage in the first scenario and simultaneously perform a first N-back test; optional step 742: providing second self-reported data (e.g. using another second questionnaire); step 750: driving in a third driving stage in a second scenario, wherein the second scenario is a relatively complex scenario comprising simulated urban road driving; optional step 752: providing second self-reported data (e.g. using yet another second questionnaire); step 760: driving in a fourth driving stage in the second scenario and simultaneously perform a second N-back test; optional step 762: providing second self-reported data (e.g. using yet another second questionnaire). Steps 710 to 762 are performed by a human driver. The method then comprises step 770: collecting data throughout the driving stages, comprising sub-step 772: collecting, using a plurality of detection means, physiological data on the test subject throughout the driving stages; wherein the physiological data collected comprises at least one of: heart rate data, EEG data, eye movement data, and respiration data, and sub-step 774: collecting driver behaviour data, comprising recording steer wheel activity of the test subject, and recording the test subject's reaction to the N-back tests. The method then comprises optional step 780: resting for a second resting duration; and optional step 790: providing third self-reported data (e.g. using a third questionnaire). Steps 780 to 790 are performed by the driver. In this method, the driving test takes place in a car simulator.

The present invention is not to be limited by the above-described aspects and embodiments, and that many variations are within the scope of the appended claims. The various aspects and embodiments may be combined if necessary and appropriate. The drawings serve as exemplary illustrations of the invention only, to aid understanding of the invention.

APPENDIX 1

Timings according to an experimental protocol:

| Duration | Stage |
|---|---|
| ~3 min | Questionnaire (type 1) |
| 3 min | Rest + Closed eyes |
| 1 min | Rest + Open eyes |
| 5 min | Driving (endless road scenario) |
| ~3 min | Questionnaire (type 2) |
| 5 min | Driving (endless road scenario) with N-back |
| ~3 min | Questionnaire (type 2) |
| 5 min | Driving (urban scenario) |
| ~3 min | Questionnaire (type 2) |
| 5 min | Driving (urban scenario) with N-back |
| ~3 min | Questionnaire (type 2) |
| 5 min | Driving (endless road scenario) with DRT |
| ~3 min | Questionnaire (type 2) |
| 5 min | Driving (urban scenario) with N-back and DRT |
| ~3 min | Questionnaire (type 2) |
| 3 min | Rest + Open eyes |
| 1 min | Rest + Closed eyes |
| ~20 min | Questionnaire (type 3) |

In the above table: each driving section is indicated to last 5 minutes, but this may alternatively be any duration between 4 and 6 minutes, more preferably 4.5 to 5.5 minutes; each rest period indicated to last 3 minutes may alternatively be any duration between 2 and 4 minutes; each rest period indicated to last 1 minute may alternatively be any duration between 0.5 and 2 minutes; the indicated timings for the test subject to complete each of the questionnaires are also approximate.

A reduced version of protocol may involve fewer and/or shorter driving stages. For example, the driving stages may include in the following order:

- simulated urban driving period of about 5 minutes (urban driving session);
- simulated highway driving period of about 5 minutes (highway driving session);
- simulated urban driving with simultaneous cognitive task for about 5 minutes (urban+test driving session);
- simulated highway driving with simultaneous cognitive task period for about 5 minutes (highway+test driving session);

totaling about 20 minutes of driving (about 25 km in length). The order of driving stages is counterbalanced.

The invention claimed is:

1. A method of collecting data for determining a psychophysiological state of a human driver, comprising:
- performing a driving session of a driver in a car simulator, wherein the driving session comprises:
  - a plurality of driving stages, the plurality of driving stages comprising:
    - a first stage of driving in a first scenario;
    - a second stage of driving in the first scenario, wherein the driver undergoes a first cognitive test simultaneously with the driving;
    - a third stage of driving in a second scenario; and
    - a fourth stage of driving in the second scenario, wherein the driver undergoes a second cognitive test simultaneously with the driving;
- wherein the first scenario simulates a driving scenario of a first level of complexity,
- wherein the second scenario simulates a driving scenario of a second level of complexity higher than the first level of complexity, and
- wherein each of the first and second cognitive tests is an N-back test;
- the method further comprising:
  - collecting, throughout the driving session, physiological data on the driver and driver behavior data, wherein the physiological data comprises at least one of: heart rate data, electroencephalogram (EEG) data, eye movement data, and respiration data, and wherein the driver behavior data is indicative of a steering wheel activity of the driver and a reaction of the driver to the cognitive tests.

2. The method in accordance with claim 1, wherein the plurality of driving stages further comprises:
- a fifth stage of driving by the driver in the first scenario, wherein a third cognitive test is performed by the driver simultaneously with the driving; and
- a sixth stage of driving by the driver in the second scenario, where fourth and fifth cognitive tests are performed by the driver simultaneously with the driving;
- wherein each of the third and fifth cognitive tests are detection response tasks (DRTs), and wherein the fourth cognitive test is an N-back test.

3. The method in accordance with claim 2, wherein each DRT comprises the driver reacting to the at least one visual stimulus, and wherein said recording the driver's reaction comprises at least one of: recording a response time of the user in reaction to the visual stimulus, a number of correct responses, and a number of incorrect responses in each DRT.

4. The method in accordance with claim 3, wherein in each DRT the driver reacts to the at least one visual stimulus by physically pressing a button in the car simulator.

5. The method in accordance with claim 3, wherein in at least one of the DRTs, at least one false stimulus is provided to the driver that the driver is instructed to ignore; wherein, the visual stimulus comprises a visual indication in a first color, and the false stimulus comprises a visual indication in a second color different from the first color.

6. The method in accordance with claim 1, wherein in each N-back test the driver reacts by physically pressing a button in the car simulator.

7. The method in accordance with claim 1, wherein each of the plurality of driving stages has a time duration of between 4 and 6 minutes.

8. The method in accordance with claim 1, wherein the driving session takes place after a first period of rest by the driver for a first predetermined duration, and a second period of rest by the driver for a second predetermined duration takes place after the driving session.

9. The method in accordance with claim 8, further comprising:
- collecting self-reported data from the driver before, during and after the driving session, the self-reported data comprising data on at least one of: the driver's psychological state, physical state and prior sleep conditions.

10. The method in accordance with claim 9, wherein collecting self-reported data comprises:
- collecting first self-reported data before the first period of rest;
- collecting second self-reported data after each of the plurality of driving stages during the driving session;
- collecting third self-reported data after the second period of rest.

11. The method in accordance with claim 1, wherein the physiological data on the driver and the driver behavior data is collected via a plurality of detection means, and wherein the plurality of detection means comprises at least one of: ECG apparatus for obtaining heart rate data, EEG apparatus for obtaining EEG data, at least one eye-tracking camera for obtaining eye movement data, at least one camera for obtaining video data of the driver's face, and at least one photoplethysmography sensor to collect blood circulation data.

12. The method in accordance with claim 9, further comprising:
- analyzing the physiological data and the driver behavior data to determine a psychophysiological state of the driver during the driving session.

13. The method in accordance with claim 12, wherein analyzing the physiological data and driver behavior data comprises storing the collected data in a memory and/or sending the collected data to a processor for analysis.

14. The method in accordance with claim 12, further comprising storing results of the analysis and the collected physiological data and the collected driving behavior data in a database, and using the database as training data for a machine-learning algorithm to predict or estimate the psychological state of a driver when driving.

15. A system for collecting data for determining a psychophysiological state of a human driver, comprising:
- means for collecting data throughout a driving session of a driver in a car simulator, wherein the driving session comprises:
  - a first stage of driving in a first scenario;

a second stage of driving in the first scenario, wherein the driver undergoes a first cognitive test simultaneously with the driving;

a third stage of driving in a second scenario; and a fourth stage of driving in the second scenario, wherein the driver undergoes a second cognitive test simultaneously with the driving;

wherein the first scenario simulates a driving scenario of a first level of complexity, wherein the second scenario simulates a driving scenario of a second level of complexity higher than the first level of complexity, wherein each of the first and second cognitive tests is an N-back test, and wherein the means for collecting data comprises:

a plurality of detection means for collecting physiological data on the driver and driver behavior data throughout the driving session; wherein the physiological data collected comprises at least one of: heart rate data, electroencephalogram (EEG) data, eye movement data, and respiration data, and wherein the driver behavior data is indicative of a steering wheel activity of the driver and a reaction of the driver to the cognitive tests.

* * * * *